Feb. 17, 1953  L. BERNER ET AL  2,628,566
TORQUE CONVERTER
Filed Nov. 9, 1948  6 Sheets-Sheet 1
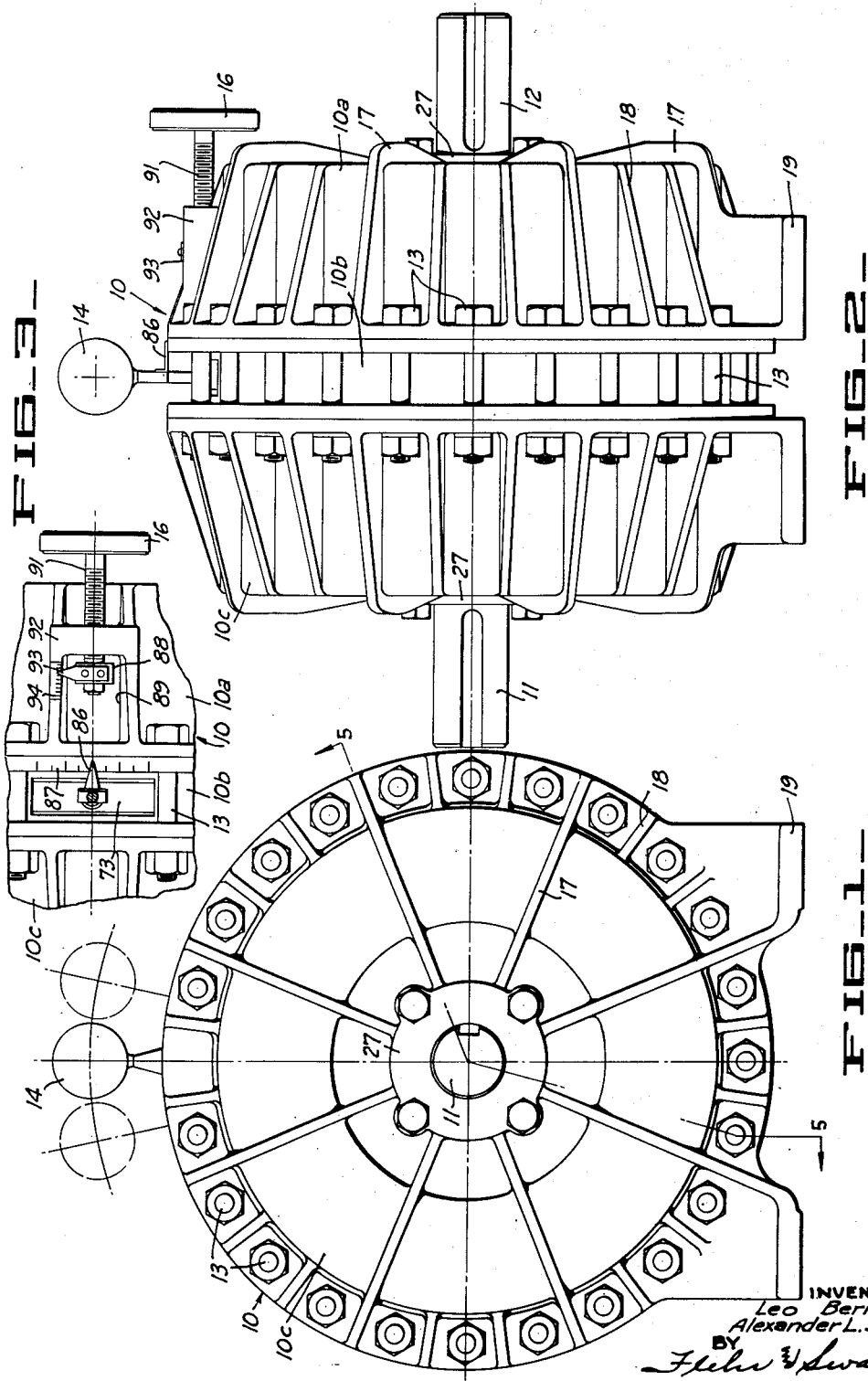
INVENTORS
Leo Berner
Alexander L. Jett
BY
*Fisher & Swain*
ATTORNEYS Feb. 17, 1953 L. BERNER ET AL 2,628,566
TORQUE CONVERTER
Filed Nov. 9, 1948 6 Sheets-Sheet 2
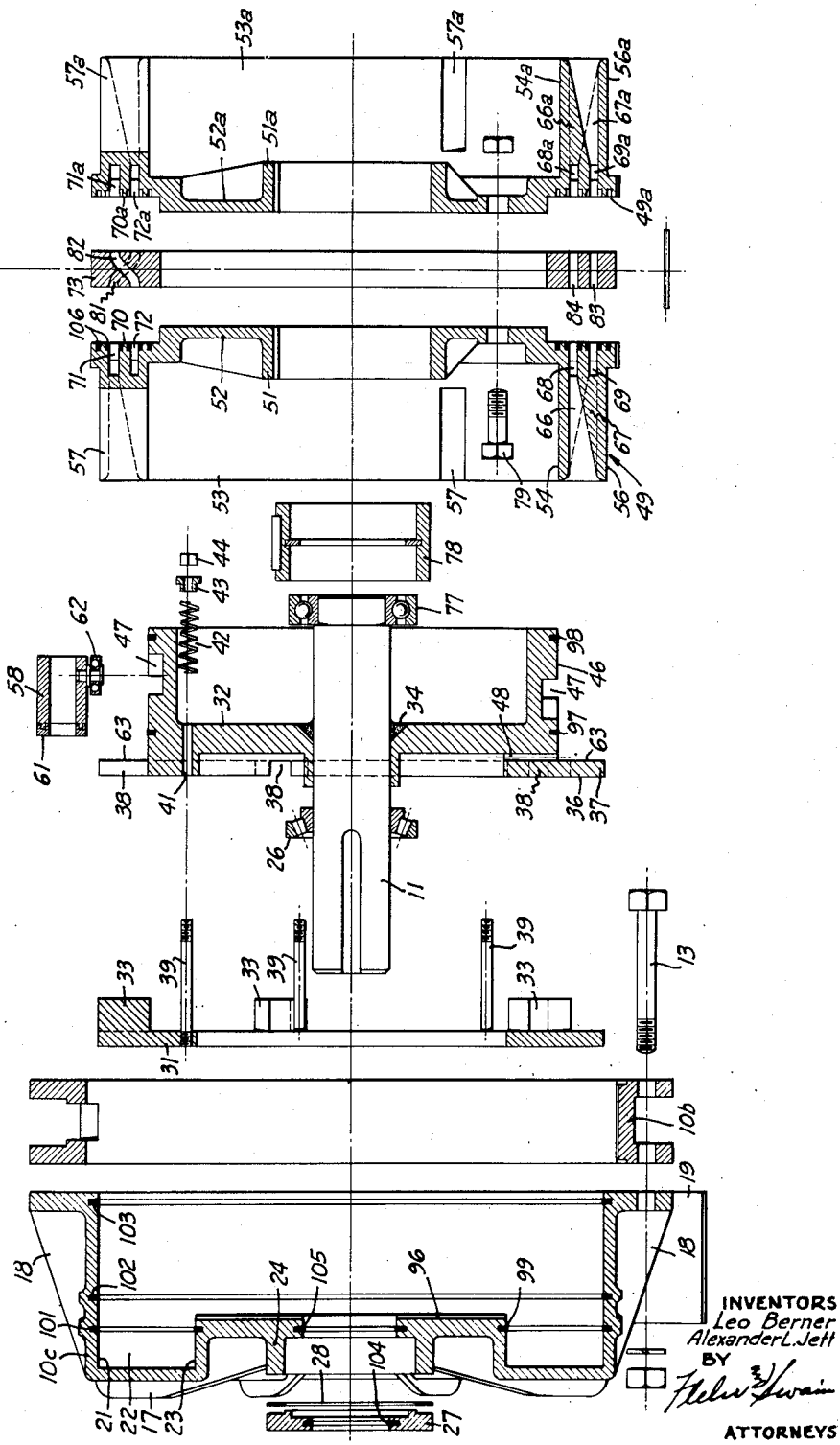

Feb. 17, 1953

L. BERNER ET AL 2,628,566

TORQUE CONVERTER

Filed Nov. 9, 1948

INVENTORS
Leo Berner
Alexander L. Jett
BY
ATTORNEYS

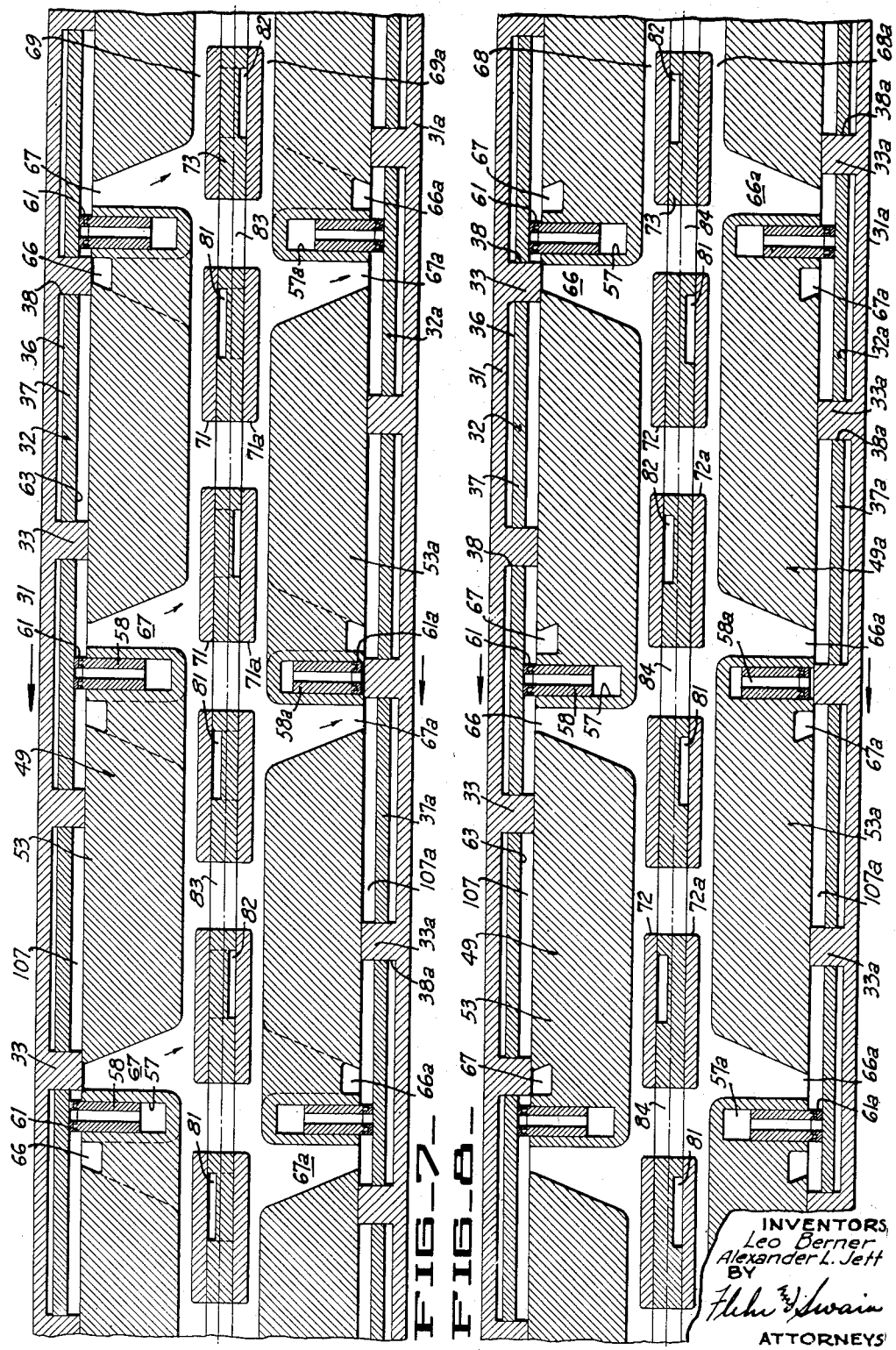

Feb. 17, 1953  L. BERNER ET AL  2,628,566
TORQUE CONVERTER

Filed Nov. 9, 1948  6 Sheets-Sheet 6

INVENTORS
Leo Berner
Alexander L. Jett
BY
ATTORNEYS

Patented Feb. 17, 1953

2,628,566

UNITED STATES PATENT OFFICE 2,628,566

TORQUE CONVERTER

Leo Berner, San Jose, and Alexander L. Jett, Menlo Park, Calif.

Application November 9, 1948, Serial No. 59,062

4 Claims. (Cl. 103—120)

This invention relates generally to devices which are known as hydraulic torque converters, and which serve to transmit varying or constant torque from a source of power to a load. The invention also relates to the construction of hydraulic devices which can be used either for the positive pumping of liquid, or for deriving rotary power from a source of liquid under pressure.

In the past various types of torque converters have been proposed to facilitate securing a desired torque and speed from a prime mover or other source of driving power. Such torque converters have application for example for automotive vehicles, locomotives, motor generator sets, machine tools, and many other types of machinery and appliances where it is now common practice to use conventional mechanism for securing a desired speed and torque, such as a change speed gearing together with a clutch.

Prior types of torque converters of the hydraulic type have been subject to many disadvantages. If constructed to give an infinitely variable drive ratio between the driven and driving shafts, the mechanism involved has been relatively complicated, thus making such units relatively expensive to manufacture and difficult to control. In addition the efficiency has been relatively low, particularly for the higher drive ratios, which has resulted in excessive heating where the driven displacement and motive units are connected in a closed hydraulic circuit.

It is an object of the present invention to provide a hydraulic torque converter of relatively simple construction and which is relatively easy to manipulate to secure adjustment over a wide range of driving ratios.

It is a further object of the invention to provide a torque converter of the above character capable of reversal of the direction of rotation of the driven shaft.

Another object of the invention is to provide a hydraulic torque converter of relatively compact construction, which incorporates both the hydraulic displacement and motor units in a single housing, together with control means for enabling reverse driving and a change in driving ratio.

An additional object of the invention is to provide an improved rotary hydraulic unit which may be operated either as a pump, or as a hydraulic motor, and which is characterized by a relatively simple mechanical construction and relatively high efficiency.

Another object of the invention is to provide a hydraulic displacement or motive unit of the above character, having certain of its operating parts balanced against end thrust by the use of hydraulic pressure.

Another object of the invention is to provide a novel hydraulic displacement or motive unit having a novel arrangement for adjusting the volume of the fluid displacement chambers, thus facilitating its use in a torque converter.

Additional objects of the invention will appear from the following description in which the preferred embodiments have been shown in detail in conjunction with the accompanying drawing.

Referring to the drawing—

Figure 1 is an end view of a hydraulic torque converter unit incorporating the present invention.

Figure 2 is a side elevational view of the torque converter shown in Figure 1.

Figure 3 is a detail showing the adjusting means for manual control of the driving ratio, together with an indicator for showing the positioning of the reversing valve.

Figure 4 is an exploded view showing the various parts of the torque converter shown in Figures 1 and 2.

Figure 7 is a cross-sectional development showing the relationship of the operating parts and taken through the ports 67 and 83 of the port rings.

Figure 8 is a development like Figure 7 but taken through the ports 66 and 84 of the port rings.

Figure 6:
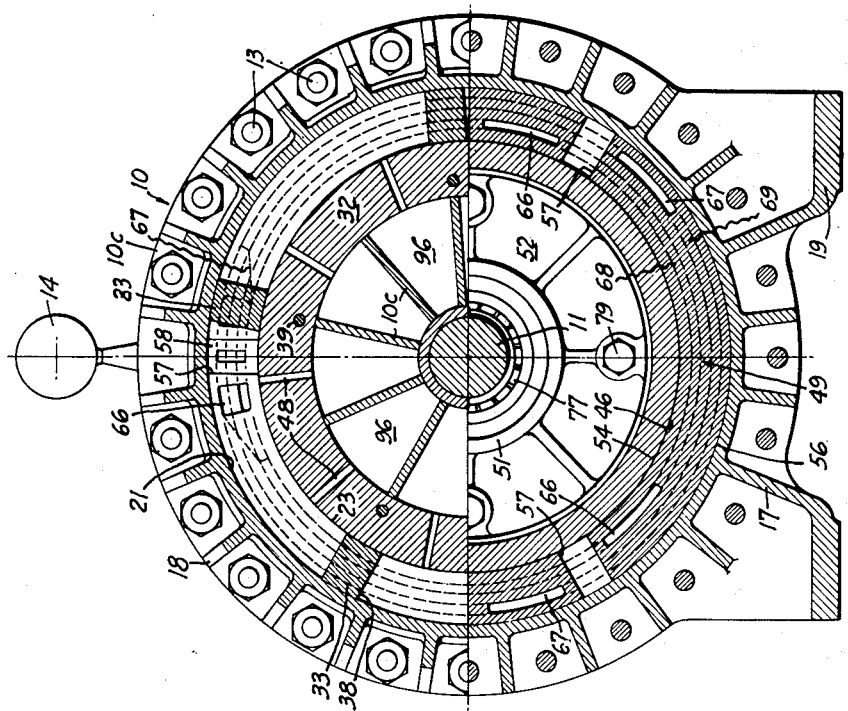
Figure 6 is a cross-sectional view taken along the line 6—6 of Figure 5.

The torque converter illustrated in Figures 1 to 10 inclusive consists of a housing 10 into which the aligned shafts 11 and 12 extend. These shafts are independently rotatable, and shaft 11 for example may be the driving shaft, and shaft 12 the driven shaft. It is convenient to form the housing of three separable sections 10a, 10b and 10c, which are normally clamped together by the bolts 13. One operating member 14 can be shifted between forward and reverse positions, as will be presently described, and another operating member 16 can be turned to vary the drive ratio. The housing parts 10a and 10c are shown provided with a plurality of spaced ribs 17 and 18, which serve to strengthen the housing and to aid in dissipation of heat to the surrounding air. One side of the housing can be provided with supporting feet 19 to facilitate mounting the device on a fixed support.

It may be explained at this point that the housing 10 serves to enclose two hydraulic units, one acting as a pump or displacement device, and the second acting as a hydraulic motor. These two units are connected in direct closed circuit within the housing through valve means under the control of operating member 14. The two units are also simultaneously and oppositely adjustable as to volumetric displacement, and this adjustment is under the control of the operating member 16.

Figure 5:
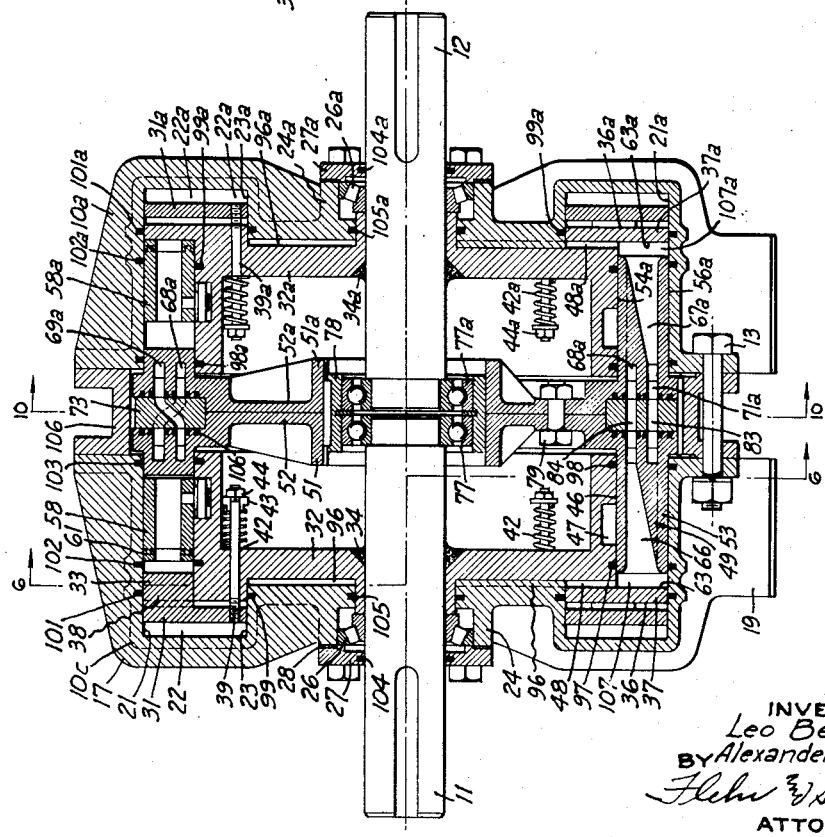
Figure 5 is a cross-sectional view taken along the line 5—5 of Figure 1.
Figure 10:
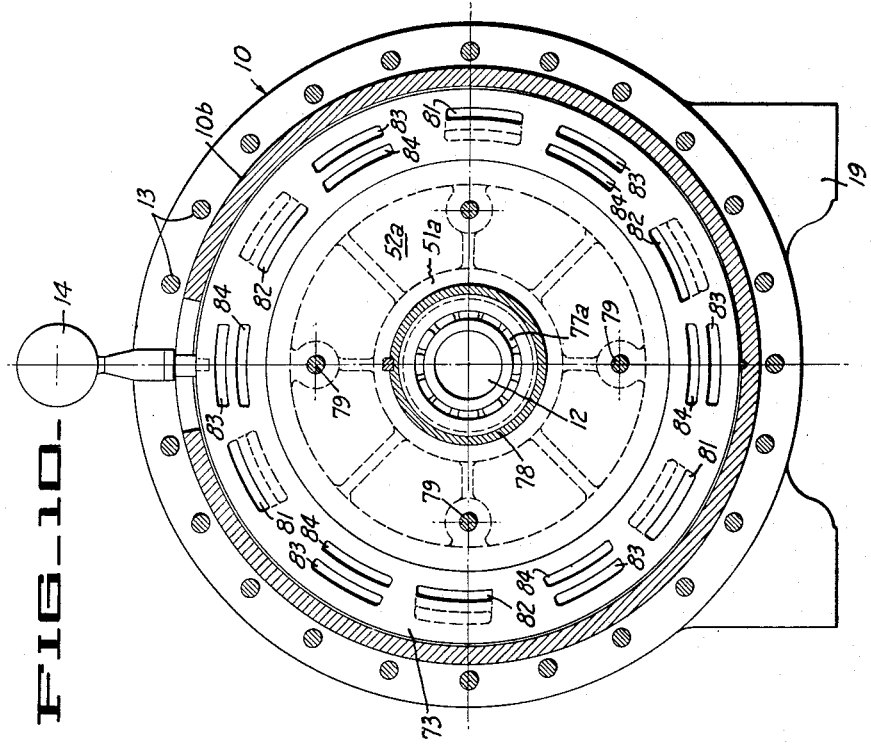
Figure 10 is a cross-sectional view taken along the line 10—10 of Figure 5.

The operating parts within the housing can best be understood by reference to Figure 4, taken together with Figure 5. Referring particularly to Figure 4, the housing part 10c is machined to provide the cylindrical bore 21, the annular pocket 22, and the inner annular cylindrical periphery 23. This housing part also includes an inner hub 24 which forms a mounting for the roller bearing assembly 26, which assembly serves to journal the shaft 11. The roller bearing assembly is normally held in place by the annular cover plate 27, which is sealed about the shaft and with respect to the housing by a shim 28 or like means.

Within the housing part 10c there is a rotor assembly consisting of the rotatable members 31 and 32. The member 31 is in the form of a substantially flat ring or annulus, having a plurality of lug-like teeth 33 extending from its one face. These teeth are spaced equally about the circumference of the member 31, and in this particular instance five teeth are employed, although the number may vary in different designs. Member 32 has a weld connection 34 or other suitable attachment to the shaft 11. It is machined to provide a planor annular face 36 proportioned similarly to the opposed face of member 31, and it is also formed to provide a flange 37, which is machined to afford slots 38 dimensioned to accommodate the teeth 33.

Figure 9:
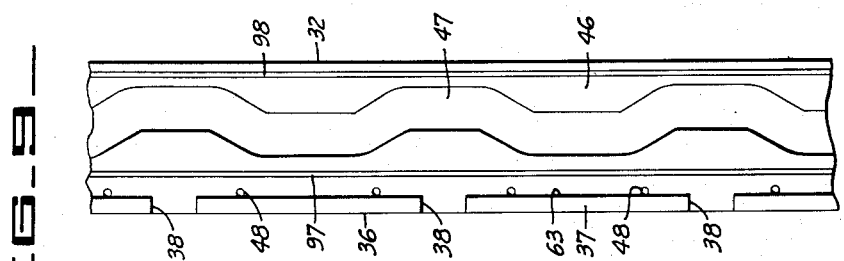
Figure 9 is a detail development showing the cam means for operating the reciprocating valve members.

When assembled as shown in Figure 5 the teeth 33 occupy the slots 38, and project beyond the inner face of the flange 37, to form displacement areas as will be presently explained. Member 31 is also provided with a plurality of circumferentially spaced guide rods 39, which extend slidably through openings 41 in the member 32, and which serve to guide the member 31 for adjusting movements longitudinally of the axis of the shaft. In the final assembly that part of each rod 39 which extends through and beyond the member 32 is surrounded by a compression spring 42, and this spring is held under compression between the adjacent face of member 32 and the thrust washer 43, the latter being held in position upon the rod by the nut 44. Thus the member 31 is normally urged toward the right as viewed in Figure 5, or toward the member 32. Member 32 is also machined to provide the cylindrical periphery 46 and to provide a cam groove 47, the contouring of which is illustrated in Figure 9. Also a plurality of ducts 48 are provided for a purpose to be presently described.

Associated with the rotatable members 31 and 32 there is a port ring 49. This ring is formed and machined to provide an inner hub 51, an outwardly extending web 52, and an annular ported body 53. This ported body is machined to provide the inner and outer cylindrical peripheral surfaces 54 and 56.

The ported body part 53 of the manifold ring is machined to provide the slots 57, which extend parallel to the axis of shaft 11. Each slot 57 serves to accommodate a reciprocating valve member 58, and in a typical instance where five teeth 33 are employed as previously mentioned, there may be three slots 57 cooperating with three valve members 58. Assuming that the slots 57 have parallel planor sides, each valve member 58 is substantially rectangular in cross-sectional contour, except however that the outer and inner surfaces can be curved to the same curvature as the cylindrical bore 21 and the surface 46. For the sake of lightness each valve member 58 can be made of hollow construction as illustrated, and it is provided with an end facing 61 of suitable material adapted to facilitate making sealed engagement with surfaces to be presently described, and to minimize wear. Each valve member 58 also carries a cam roller 62, which is adapted to operate in the cam groove 47.

Referring particularly to Figure 5 in the final assembly the valve members are disposed within their corresponding slots 57 with the end facing 61 of each valve member in opposition with the flange 37 on the rotatable member 32. It may be briefly explained at this point that when the members 31 and 32 rotate upon rotating the shaft 11, the valve members 58 are reciprocated in a direction longitudinally of the axis of the shaft to retract and advance the same with respect to the flange 37. They are retracted sufficiently far to pass the teeth 33, and they advance into sealing relationship with the face 63 of flange 37, to form fluid displacement barriers.

As is better illustrated in Figure 5, the manifold ring 49 has its outer periphery 56 machined for a sliding fit within the bore 21 of the housing part 10c, and has its inner periphery 54 machined to provide a running fit about the periphery 46 of the rotatable member 32. The manifold ring 49 does not rotate, but remains non-rotatable relative to the housing.

The manifold ring 49 is provided with two sets of inner and outer ports, designated by numbers 66 and 67. The ports 66 all communicate with an annular passage 68, and ports 67 all communicate with the adjacent annular passage 69. These passages in turn communicate with circumferentially spaced ports 71 and 72, which open through the planor face 70. The arrangement of these ports and passages can best be understood by reference to Figures 7 and 8. It may be explained that Figure 7 is a schematic development of the ports 67, together with the passage 69, while Figure 8 is a development of the ports 66 together with the passage 68.

The motor which cooperates with the displacement unit has parts substantially identical with the parts just described. The parts of this motor unit have been designated by like numbers with the suffix a. With the exception of the port ring 49a, these parts are omitted from the exploded view of Figure 4.

Adjacent ends of the two aligned shafts 11 and 12 are journaled by the ball bearing assembly 77 and 77a, which are carried by the sleeve 78. The two hub portions 51 and 51a of the manifold member are splined with respect to sleeve 78, so that the two manifold members may be shifted longitudinally of the axis of the shafts. Bolts 79 serve to secure the port rings together.

The valve ring 73 is provided with two sets of cross over ports 81 and 82, which are adapted to communicate between the ports 71, 72 and 71a, 72a. In addition the ring 73 provides another set of straight through ports 83, 84, which likewise communicate between ports 71, 72 and 71a, 72a. The valve ring is dimensioned to fit snugly between the opposed faces 70 and 70a of the two manifold rings, and is attached to the external operating member 14. An index pointer 86 (Figure 3) operating in conjunction with the scale 87 indicates the position of the valve ring. The two positions of the valve ring are for forward and reverse drive.

As previously pointed out the two port rings can be adjusted longitudinally of the axis of the shafts. These parts are suitably splined to the housing (as by means of keys not shown), and one of the rings, as for example the ring 49a, is provided with a projecting lug 88 (Figure 3) which extends through an opening 89 in the housing part 10a. The lug 88 is secured to the threaded rod 91, which in turn is threaded in a bracket 92 carried by the housing. Lug 88 also has a pointer 93 which cooperates with the scale 94. Thus by turning the control member 16, the lug 88 together with the two manifold members 49 and 49a can be moved a limited distance longitudinally of the shafts. As will be presently explained this serves the purpose of changing the drive ratio by oppositely adjusting the volumetric displacements of the two hydraulic units.

Suitable sealing means and gaskets are employed between the stationary and relatively movable parts to prevent leakage. Thus the rotating members 32 and 32a are provided with seal rings 97, 98, and 97a, 98a, to seal upon the inner peripheries of the manifold rings 49, 49a. The body part 10c is likewise provided with the peripheral seal rings 99, 101, 102, and 103, and similar seal rings are provided for the body part 10a. Likewise referring to the housing part 10c the cover ring 27 for the shaft bearing is provided with the oil seal ring 104, and the body itself is provided with an inner seal ring 105, which seals upon the inner hub of the rotatable member 32. Like seal rings are provided for the body part 10a. The face 70 of the manifold ring 49 is provided with a plurality of concentric seal rings 106, and like seal rings are provided for the manifold ring 49a. These seal rings facilitate making sealed engagement with the side faces of the valve ring 73.

Operation of the complete assembly described above is as follows: It will be presumed that a source of power, such as an internal combustion engine, is applied to the driving shaft 11, and that the shaft 12 is attached to drive a load, such as the wheels of a motor vehicle. Turning of the shaft 11 turns the associated rotor assembly of the pumping unit, consisting of the rotatable members 31 and 32. Also it is assumed that the closed circuit formed by the various chambers, ports and passages is substantially completely filled with liquid such as a suitable oil. As best understood by reference to Figure 7, the spaces between the teeth 33 form chambers 107, from which liquid is displaced as the pumping unit rotates. Assuming that the direction of rotation is to the left as indicated by the arrow, the middle valve member 58 is expelling liquid from that part of the chamber 107 extending between this valve member and the adjacent tooth 33 on the right hand side of the same. This liquid is being expelled into the communicating port 67. The left hand valve member 58 is shown in a position after substantially all of the liquid has been displaced from the right of the same, and the adjacent tooth 33 has closed the entrant end of the adjacent port 67. At this instant the valve member 58 commences to retract by virtue of the shaping of cam groove 47, so that it passes the adjacent tooth 33. The upper right hand valve member 58 of Figure 7 has just passed the adjacent tooth 33, and has again been projected into sealing engagement with the adjacent face of flange 37. Therefore in this instance liquid is being expelled from that portion of chamber 107 which extends to the right of the valve member 58, and this liquid is being delivered into the ports 67.

Simultaneously with discharge of liquid into the ports 67 as described above, liquid flows through the ports 66 into the chambers 107. Thus for the middle valve member 58 liquid is being delivered through the corresponding port 66 into that part of the chamber 107 which extends to the left of the valve member 58. For the left hand valve member 58 the major part of the chamber 107 has been filled with liquid. For the right hand valve member 58 liquid is about to be admitted to the chamber 107. As previously explained the ports 67 deliver liquid into the common passage 69 and from this passage the liquid is delivered through the ports 71 and through ports in the valve ring 73.

The motor unit has an action similar to the pumping or displacement unit. Thus in this instance the teeth 33a are moving to the left as viewed in Figure 7, and the valve members 58a are being projected and retracted in the same manner as described for the pumping unit. The middle valve member 58a is shown passing the adjacent tooth 33a. The left and right hand valve members 58a are in sealing contact with the flange 37a. Thus liquid continuously flows through the ports 67a into the portions of chambers 107a which extend to the left of the valve members 58a, and the liquid is being continually delivered from the portions of the chambers 107a which extend to the right of the valve members 58a, through the ports 66a.

Figure 8 illustrates the working parts in the same operating positions as Figure 7, except that the development in this instance is on a plane through the inner ports 66 and 66a.

The distribution of liquid flow between the pumping and motor units is under the control of the valve member 73. For the position of this valve member illustrated in Figures 7 and 8, the pumping unit is adapted to drive the motor unit in the same direction. Thus the ports 83 and 84 in the ring 73 are in registry with the ports 71 and 72 of the manifold rings, whereby liquid being expelled under pressure through the ports 67, flows through ports 83 of the valve ring, to the ports 71a and 72a. Therefore liquid expelled from the ports 67 is caused to flow through the ports 67a (Figure 7) to act upon the pressure areas of the teeth 33a in such a manner as to cause the motor unit to rotate in the same direction, that is to the left as viewed in Figure 7. Movement of ring 73 to bring the cross over ports 81, 82 into registry with ports 71, 72 and 71a, 72a serves to reverse the flow through ports 66a, 67a, and thus drive the motor unit in a reverse direction.

In addition to the two operating positions for the valve member 73 described above, it is possible to place the lever 14 in an intermediate position (solid line position Fig. 1) whereby the closed hydraulic circuit between the motor and pumping units is interrupted. This is made possible by proportioning the circumferential extent of the ports 71, 72 and 71a, 72a, relative to the ports in the annular valve member, whereby a substantial overlap between these ports is provided for the intermediate position of the control lever 14. Thus liquid being pumped by the pumping unit is caused to flow directly back to the intake of the same, thus avoiding delivery of liquid under pressure to the motor unit. In many applications this neutral position is desirable, as for example in connection with automotive applications where for example the neutral position can be used in order to secure free wheeling.

In the foregoing explanation no reference has been made to changing the drive ratio between the pumping and motor units. As illustrated in Figures 7 and 8, the chambers 107 and 107a are of substantially the same width. Therefore neglecting a slight amount of slippage, the driving ratio between the shafts 11 and 12 would be 1 to 1. Assuming now that the control member 16 is turned to decrease the dimensioning of chamber 107 and increase the width of chamber 107a, it will be apparent that for a given speed of operation of the shaft 11, the volume of liquid discharged will be less because of the smaller volume of the chambers 107, and this factor alone would result in a slower speed of rotation for the motor. However in addition to this factor the motor unit must turn at a reduced speed because of the increase in the volume of its chambers 107a. In other words this increase in volume alone would require a greater amount of liquid to be supplied in order to maintain the same speed of operation. When the size of the displacement chambers 107 is increased by turning the control member 16 in an opposite direction, the amount of liquid for a given speed of operation for the shaft 11 is correspondingly increased. At the same time the volume of the chambers 107a of the motor is reduced, and this factor, taken together with the increased volume of liquid supplied by the pumping unit, makes for a greater speed of operation of the motor unit.

It will be evident from the foregoing that our device makes possible a wide range of drive ratio and that within this wide range any ratio desired may be selected. Changes in drive ratio may be made while the device is in operation, as is desirable in many applications, as for example for automotive vehicles. By adjusting the control member 16 so that the pumping unit has zero volume for the chambers 107, that is to bring the face of the flange 37 in the same plane as the end faces of the teeth 33, provides a neutral position, or one in which no liquid will be pumped and therefore the motor unit is permitted to remain stationary irrespective of the speed of rotation of the shaft 11. Assuming a given speed of rotation of the shaft 11, if the control member 16 is now turned to commence delivery of liquid by the pumping unit, the motor unit starts in operation, commencing first with a relatively slow speed, and then increasing as the width of the chambers 107 increases. With the other extreme for the adjustment of the member 16, the width of the chambers 107a for the motor unit may be relatively small, thus providing a speed of rotation of the shaft 12 which is many times the rotational speed of shaft 11. Thus assuming a speed of 500 R. P. M. for shaft 11, shaft 12 may for example be varied in speed from zero to 5000 R. P. M. When substantial loads are applied with transmission of considerable power, the rotating parts tend to take considerable thrust longitudinally of the shafts. Oil ducts 48, 48a together with pockets 96, 96a serve to apply operating pressures developed in each unit to the exposed end areas of the rotatable members 32, 32a, and this in turn tends to reduce end thrust applied to the shafts and shaft bearings.

Our torque converter has wide applications for various types of equipment. It may be used to advantage with various types of motor vehicles to take the place of conventional speed change gears and clutches. It is also applicable to a variety of machinery and appliances where it is desired to provide a wide range of drive ratios, as for example machine tools, motor generator sets, marine craft, and all of the various types of self-propelled vehicles.

When used with automotive vehicles, lever 14 can be shifted between its forward and reverse positions in order to secure forward and reverse movement of the vehicle. As previously mentioned neutral position shown in solid lines in Figure 1 can be used in order to secure free wheeling. When the vehicle is moving downhill one may brake on compression by torque transmitted by the device, and the amount of braking effort can be varied by adjustment of the drive ratio. Instead of operating the control members manually, it is possible to provide for their automatic operation. For example suitable centrifugal means can be provided, responsive to the speed of the shaft 12, for the automatic setting of the control member 16.

Figure 12:
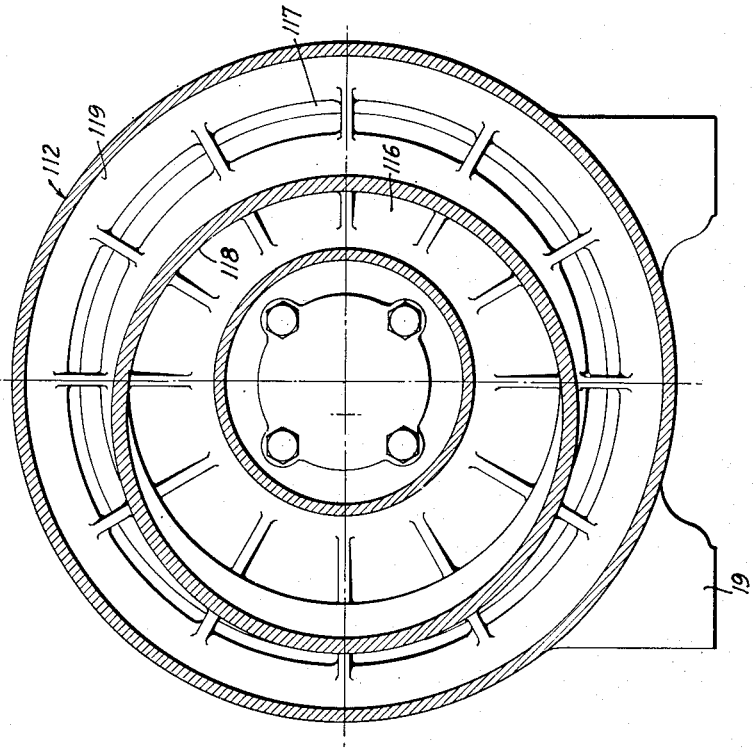
Figure 12 is a cross-sectional detail taken along the line 12—12 of Figure 11.
Figure 11:
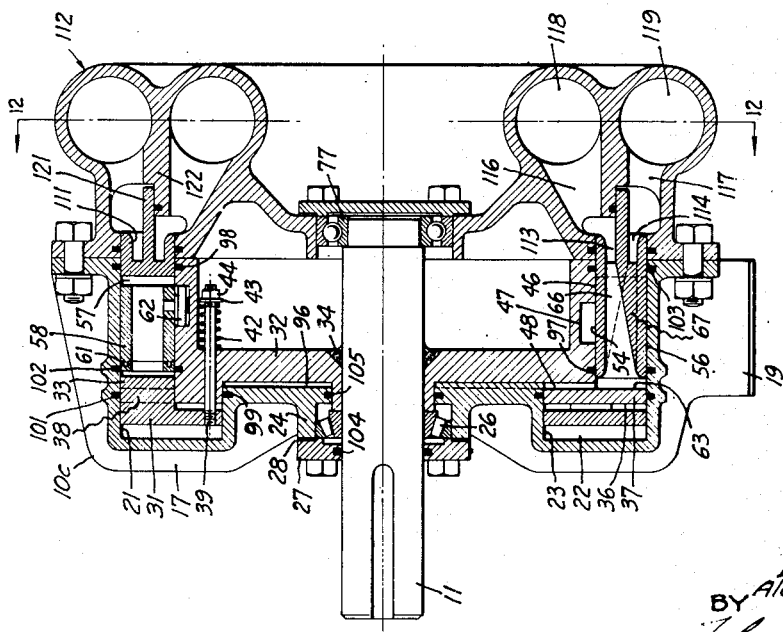
Figure 11 is a cross-sectional view showing another embodiment of the invention, in which a single hydraulic unit is provided for use as a pump or motor.

It is possible to incorporate features of our invention in a unit such as shown in Figures 11 and 12, which can be used for either liquid pumping or as a motor to be driven by liquid or air under pressure. Thus in this instance the housing part 10c, together with the rotatable parts 31 and 32, are substantially the same as in Figures 1 to 10 inclusive. However instead of the port ring 49, there is a ring 111 of modified construction. The ring 111 does not have a web for cooperative relationship with the shaft 11, but extends into a special manifold 112, which in effect forms a part of the housing. The ports 66 and 67 formed in the port ring 111 communicate with annular passages 113 and 114 which in turn are connected by passages 116 and 117 with the manifold passages 118 and 119. The ring 111 is also provided with an annular extension 121 which overlaps and has a slidable seal with the annular wall 122 of manifold 112. Passages 118, 119 connect with external piping (not shown).

A suitable control member (not shown) is provided for adjusting the member 111, as for example a control member like the member 14 of Figure 3.

As previously stated the device of Figures 11 and 12 can be used either as a pump or as a motor. When used as a pump its volumetric displacement is dependent upon the adjustment of the port ring 111. When used as a motor, the torque produced and the speed of rotation is likewise dependent upon the adjustment of the ring 111.

We claim:

1. In a hydraulic device of the type described, a housing, a shaft extending axially into the housing, an annular member mounted on the shaft to rotate therewith and having circumferentially spaced slots, a ring adjacent one side of said member and provided with a plurality of teeth extending from one face of the same, said teeth being circumferentially spaced and accommodated in said circumferentially spaced slots formed in the annular member, a port ring nonrotatably carried within the housing and having an end face which faces toward the annular member, said port ring having circumferentially spaced slots formed in the same extending longitudinally of the axis of the shaft and also having ports for liquid flow, an end face of the port ring being spaced from said end face of the annular member to form displacement chambers between said teeth, valve members slidably disposed in the slots formed in the port ring, and means for automatically retracting and advancing said valve members upon rotation of said rotatable member, whereby when a valve member is retracted it passes an adjacent tooth and when advanced it extends into and forms a fluid barrier in an associated displacement chamber, the porting of said port ring providing inflow and discharge ports for liquid flowing into and out of said chambers.

2. A hydraulic device as in claim 1 in which the ring adjacent the annular member which provides the circumferentially spaced teeth is mounted for adjusting movement longitudinally of the shaft, and in which said port ring is likewise mounted for adjustment longitudinally of the shaft to thereby vary the volume of said displacement chambers.

3. A hydraulic device as in claim 1 in which cam means, including a cam groove formed in said annular member, is provided to reciprocate said valve members.

4. A hydraulic device as in claim 1 in which the means for retracting and advancing the valve members includes a cam groove formed in a peripheral portion of said annular member, said portion being located adjacent the sides of the valve members which face the axis of said shaft.

LEO BERNER.
ALEXANDER L. JETT.

REFERENCES CITED

The following references are of record in the file of this patent:

UNITED STATES PATENTS

| Number | Name | Date |
| --- | --- | --- |
| 1,017,355 | White | Feb. 13, 1912 |
| 1,276,372 | Johnson | Aug. 20, 1918 |
| 1,365,553 | Sheriff | Jan. 11, 1921 |
| 1,571,954 | Lambert | Feb. 9, 1926 |
| 2,434,590 | Runde | Jan. 13, 1948 |